(12) United States Patent
Tuukkanen

(10) Patent No.: US 9,499,175 B2
(45) Date of Patent: Nov. 22, 2016

(54) METHOD AND APPARATUS FOR PROVIDING AN OPERATIONAL CONFIGURATION FOR AN AUTONOMOUS VEHICLE

(71) Applicant: HERE Global B.V., Veldhoven (NL)

(72) Inventor: Marko Tuukkanen, Schlenzer (DE)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/559,402

(22) Filed: Dec. 3, 2014

(65) Prior Publication Data

US 2016/0159368 A1 Jun. 9, 2016

(51) Int. Cl.
| | |
|---|---|
| *B60W 50/08* | (2012.01) |
| *G01C 21/32* | (2006.01) |
| *B60R 1/00* | (2006.01) |
| *B60W 50/10* | (2012.01) |
| *B60W 40/08* | (2012.01) |
| *B60W 40/09* | (2012.01) |

(52) U.S. Cl.
CPC ............ *B60W 50/085* (2013.01); *B60W 40/08* (2013.01); *B60W 40/09* (2013.01); *B60W 50/08* (2013.01); *B60W 50/10* (2013.01); *B60W 2040/0872* (2013.01); *B60W 2550/12* (2013.01)

(58) Field of Classification Search
CPC ........... G01C 21/32; G01C 3/06; B60T 7/22; G06K 9/00805; G06N 5/02; B60R 1/00; G08G 1/167
USPC ......... 701/23, 24, 28, 450; 706/46; 382/104; 73/488; 348/36
See application file for complete search history.

(56) References Cited

U.S. PATENT DOCUMENTS

| | | | |
|---|---|---|---|
| 6,141,619 A | 10/2000 | Sekine | |
| 8,527,199 B1 * | 9/2013 | Burnette | G01C 21/32 701/23 |
| 8,676,431 B1 * | 3/2014 | Mariet | B60T 7/22 701/28 |
| 8,712,624 B1 | 4/2014 | Ferguson et al. | |
| 8,831,813 B1 | 9/2014 | Ferguson et al. | |

(Continued)

FOREIGN PATENT DOCUMENTS

| | | |
|---|---|---|
| DE | 102009028767 A1 | 2/2011 |
| DE | 102010038970 A1 | 2/2012 |

(Continued)

OTHER PUBLICATIONS

Sven Kraus et al., "Cognition and Emotion in Autonomous Cars", posted online on Jun. 2009, retrieved on Mar. 3, 2015, from http://www6.in.tum.de/Main/Publications/Kraus2009.pdf, pp. 1-6.
Chris Davies, "for Autonomous Cars, Driving Dumb is Key", posted online on Apr. 16 2014, retrieved on Mar. 3, 2015, from http://www.slashgear.com/for-autonomous-cars-driving-dumb-is-key-16325366/, pp. 1-14.

(Continued)

*Primary Examiner* — Yuri Kan
(74) *Attorney, Agent, or Firm* — Dittavong & Steiner, P.C.

(57) ABSTRACT

The approach involves determining vision capability information for one or more occupants of at least one vehicle. The approach also involves processing and/or facilitating a processing of the vision capability information to determine an estimated comfortable operational configuration for the at least one vehicle. The approach involves determining a maximum operational configuration for the at least one vehicle. The approach also involves determining a recommended operational configuration for the at least one vehicle based, at least in part, on the estimated comfortable operational configuration and the maximum operational configuration.

20 Claims, 14 Drawing Sheets

(56) References Cited

U.S. PATENT DOCUMENTS

| | | | | |
|---|---|---|---|---|
| 2003/0005765 A1* | 1/2003 | Brudis | ............... | G08G 1/167 73/488 |
| 2011/0026771 A1* | 2/2011 | Hsu | ............... | G06K 9/00805 382/104 |
| 2013/0151454 A1* | 6/2013 | McCarthy | ............ | G06N 5/02 706/46 |
| 2013/0245877 A1* | 9/2013 | Ferguson | ............ | B60R 1/00 701/23 |
| 2014/0132707 A1* | 5/2014 | Hashimoto | ......... | G01C 3/06 348/36 |

FOREIGN PATENT DOCUMENTS

| | | | |
|---|---|---|---|
| DE | 102013006793 | A1 | 10/2014 |
| EP | 1302356 | A1 | 4/2003 |
| EP | 2154043 | A1 | 2/2010 |

OTHER PUBLICATIONS

Office Action for corresponding European Patent Application No. 15195945.9-1752, dated Apr. 25, 2016, 10 Pages.

* cited by examiner

300

METHOD AND APPARATUS FOR PROVIDING AN OPERATIONAL CONFIGURATION FOR AN AUTONOMOUS VEHICLE

BACKGROUND

There is increasing interest in the development of vehicles (e.g., autonomous vehicles, highly-assisted vehicles (HAD), etc.) that are able to at least partially drive or otherwise operate themselves without input from vehicle users or occupants. One area of development has been with respect to providing a "humanized" driving experience for such vehicles. For example, a humanized driving experience refers to configuring autonomous or HAD vehicles to operate as their occupants or users would if the users were to manually operate the vehicle. Such a humanized driving experience can be important to ensuring a comfortable user experience especially for new users first getting accustomed to an autonomous vehicle. In particular, one source of potential discomfort is when an autonomous vehicle is operated in a way that exceeds an operational configuration (e.g., exceeds a usual speed) that a user would normally use to operate the vehicle given the environment visible to the user from the vehicle. Accordingly, service providers and manufacturers for such vehicles face significant technical challenges to enabling a more comfortable user experience by reconciling the visual experience with the operational configuration of autonomous or HAD vehicles.

SOME EXAMPLE EMBODIMENTS

Therefore, there is need for an approach for providing a humanized driving experience for autonomous vehicles.

According to one embodiment, a method comprises determining vision capability information for one or more occupants of at least one vehicle. The method also comprises processing and/or facilitating a processing of the vision capability information to determine an estimated comfortable operational configuration for the at least one vehicle. The method further comprises determining a maximum operational configuration for the at least one vehicle. The method also comprises determining a recommended operational configuration for the at least one vehicle based, at least in part, on the estimated comfortable operational configuration and the maximum operational configuration.

According to another embodiment, an apparatus comprises at least one processor, and at least one memory including computer program code for one or more programs, the at least one memory and the computer program code configured to, with the at least one processor, to cause, at least in part, the apparatus to determine vision capability information for one or more occupants of at least one vehicle. The apparatus is also caused to process and/or facilitate a processing of the vision capability information to determine an estimated comfortable operational configuration for the at least one vehicle. The apparatus is further caused to determine a maximum operational configuration for the at least one vehicle. The apparatus is also caused to determine a recommended operational configuration for the at least one vehicle based, at least in part, on the estimated comfortable operational configuration and the maximum operational configuration.

According to another embodiment, a computer-readable storage medium carrying one or more sequences of one or more instructions which, when executed by one or more processors, cause, at least in part, an apparatus to determine vision capability information for one or more occupants of at least one vehicle. The apparatus is also caused to process and/or facilitate a processing of the vision capability information to determine an estimated comfortable operational configuration for the at least one vehicle. The apparatus is further caused to determine a maximum operational configuration for the at least one vehicle. The apparatus is also caused to determine a recommended operational configuration for the at least one vehicle based, at least in part, on the estimated comfortable operational configuration and the maximum operational configuration.

According to another embodiment, an apparatus comprises means for determining vision capability information for one or more occupants of at least one vehicle. The apparatus also comprises means for processing and/or facilitating a processing of the vision capability information to determine an estimated comfortable operational configuration for the at least one vehicle. The apparatus further comprises means for determining a maximum operational configuration for the at least one vehicle. The apparatus also comprises means for determining a recommended operational configuration for the at least one vehicle based, at least in part, on the estimated comfortable operational configuration and the maximum operational configuration.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing an operational configuration for an autonomous vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an autonomous vehicle, it is contemplated that the approaches of the various embodiments described herein are applicable to highly-assisted driving (HAD) vehicles as well as to vehicles for which an operational configuration can be determined or recommended. Moreover, although the autonomous vehicles described are autonomous automobiles, it is contemplated that the approaches of the various embodiments described herein are applicable to any type of passenger vehicle.

Figure 1:
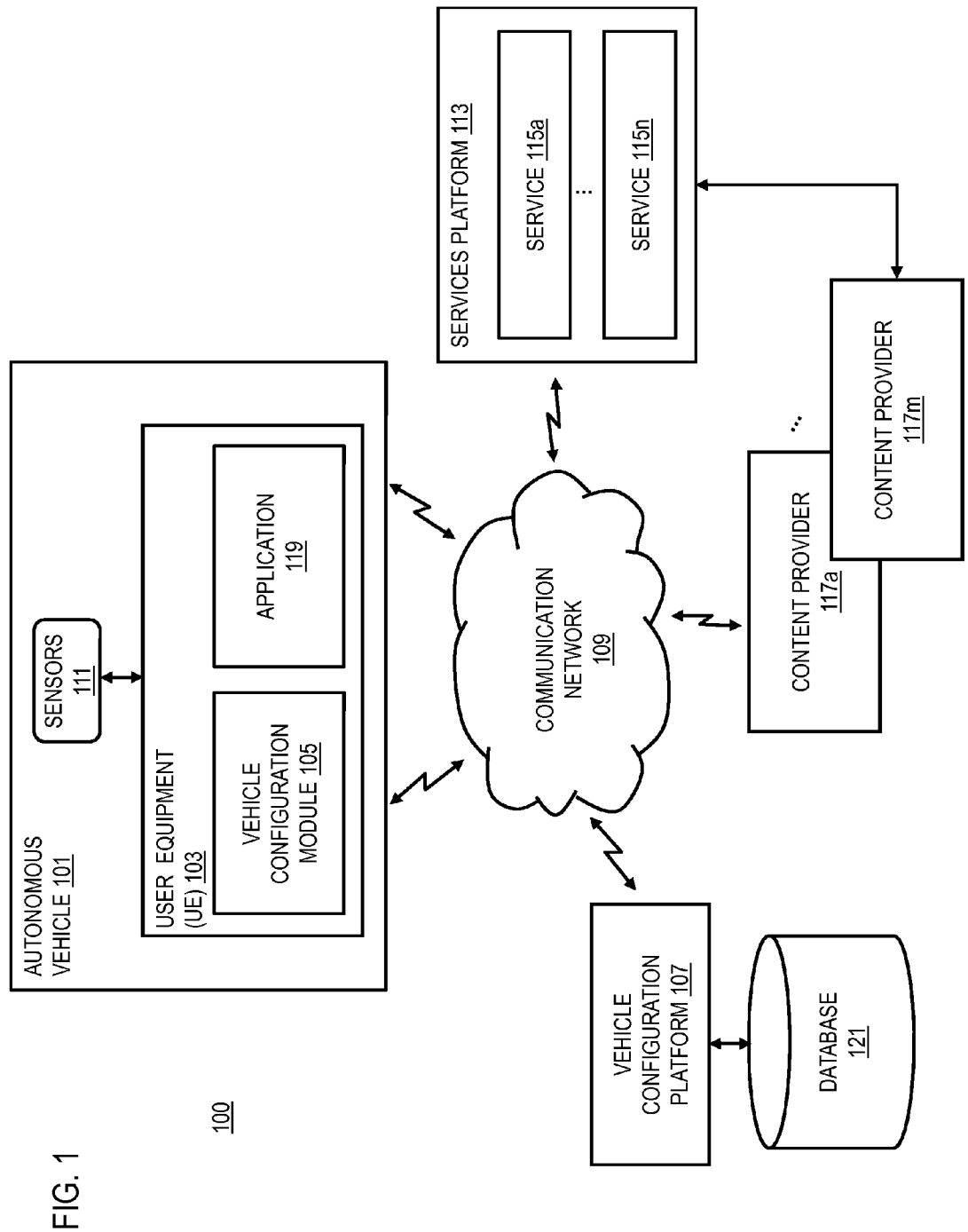
FIG. 1 is a diagram of a system capable of providing an operational configuration for an autonomous vehicle, according to one embodiment.

FIG. 1 is a diagram of a system capable of providing an operational configuration for an autonomous vehicle, according to one embodiment. As noted above, autonomous vehicles are able to drive themselves without the input of vehicle passengers or occupants. In some embodiments, autonomous vehicles achieve this self-driving capability by using sensor systems in combination with, for instance, map data (e.g., three-dimensional map data) and information received from network-based services and/or other vehicles. With this information, the vehicle generally can react to changing situations faster than a typical human driver. As a result, autonomous vehicles are able to safely operate using operational configurations (e.g., vehicle speed, acceleration rate, braking rate, etc.) that can often exceed what an operational configuration a user would use in the same situation.

For example, autonomous vehicles can often maintain higher speeds in traffic under varying conditions than a user normally would. However, this speed (or other operational configuration parameter) of the autonomous vehicle might exceed the speed which is comfortable for the occupants or passengers. As discussed above, at least some of this discomfort may be based on the vision capability or other limitations of the human eye in various situations. For example, this disparity can lead to the autonomous vehicle driving at a maximum allowed speed in situations where a human driver would slow down due to low visibility. Such a conflict can cause discomfort for the passengers and in some cases, lead to one or more of the passengers interfering with the autonomous driving activity (e.g., by hitting a panic button to stop the autonomous driving activity), thereby resulting in a poor user experience.

To address this problem, a system 100 of FIG. 1 introduces the capability to provide a humanized driving experience by setting or recommending an operational configuration for an autonomous vehicle based on vision capability information of the passengers or occupants. For example, in one embodiment, the system 100 uses a vehicle camera in normal mode (e.g., visible light mode) to define the maximum visibility of the occupants of the vehicle (e.g., the vision capability information of the occupants). In one embodiment, the vision capability information (e.g., the maximum visibility of line-of-sight of the occupants) can be defined by comparing objects visible in the camera images to available three-dimensional map data, geography, weather, traffic, etc. The system 100 uses the vision capability information to determine or estimate a comfortable operational configuration (e.g., comfortable driving speed) for the occupants. In addition, the system 100 uses the vehicle sensors (e.g., infrared, laser, radar, etc.) to define a maximum operational configuration (e.g., a maximum speed) for the vehicle. The system 100 then, for instance, sets or recommends the vehicle at an operational configuration for the vehicle based on the comfortable operational configuration (e.g., comfortable speed) and the operational maximum configuration (e.g., maximum speed). In one embodiment, the configured operational configuration is set to be the same or higher than the comfortable operational configuration but lower than the maximum comfortable configuration. Although the various embodiments described herein are discussed with speed as one example operational configuration parameter, it is contemplated that the approaches described herein are also applicable to other operational configuration parameters such as acceleration rate, braking rate, cornering forces, and the like.

In an example use case, an autonomous vehicle is traveling during the night on a curved road. The speed limit on the road is 100 km/h and the vehicle is able to keep the maximum allowed speed as the vehicle sensors are capable of detecting a clear road for the next 300 meters. However, the passenger is feeling discomfort as he/she is able to see only 100 meters ahead because of the darkness. The passenger may have driven the road in similar conditions before and maintained a speed of 70 km/h. The system 100 compares the user vision capability information (e.g., line-of-sight at 100 meters), the user's previously recorded driving experience on the road, user preferences, and/or other contextual information (e.g., weather, traffic, etc.) to generate a recommendation of 80 km/h to achieve a balance between user comfort and maximum capabilities of the vehicle. Generally, the recommended configuration can be a little higher than the estimated comfortable speed because the occupants typically may not notice such a small increase or may otherwise quickly become acclimated to the new configuration. Thus, by providing this humanized driving experience, the system 100 can potentially reduce user discomfort and anxiety while riding in an autonomous vehicle.

As shown in FIG. 1, the system 100 comprises an autonomous vehicle 101 configured with at least one user equipment (UE) 103 including a vehicle configuration module 105 that provides functions related to determining an operational configuration for the autonomous vehicle 101 using occupant vision capability information as described in the various embodiments discussed herein. In one embodiment, the autonomous vehicle 101, the UE 103, and/or the vehicle configuration module 105 has connectivity to a vehicle configuration platform 107 over a communication network 109. By way of example, the vehicle configuration platform 107 is a network component that can perform all or a portion of the functions of the vehicle configuration module 105 which is a component local to the UE 103.

Although the UE 103 is depicted as a separate component from the autonomous vehicle 101, it is contemplated that the functions of the UE 103 and/or the vehicle configuration module 105 may be performed or embedded in the autonomous vehicle 101 or a component of the autonomous vehicle 101. As shown, the autonomous vehicle 101 is further configured with the sensors 111 to that assist with autonomous driving. For example, the sensors 111 may include infrared sensors, lasers, radar, sonar, cameras (e.g., visible, night vision, etc.), and/or other devices/sensors that can scan and record data from the autonomous vehicle 101's surroundings for determining user vision capability information and/or a maximum operational configuration for the autonomous vehicle 101.

In one embodiment, the sensor information can be supplemented with additional information from network-based services such as those provided by the services platform 113 and the services 115a-115n (also collectively referred to as services 115). By way of example, the services 115 can include mapping service, navigation services, and/or other data services that provide data for estimating user vision capability information (e.g., line-of-sight calculated from map data) and/or maximum operational configurations of the autonomous vehicle (e.g., speed limits, vehicle capability information, vehicle condition information, etc.). In one embodiment, the services platform 113 and/or the services 115 can provide contextual information such weather, traffic, etc. as well as facilitate communications (e.g., via social networking services, messaging services, crowdsourcing services, etc.) among vehicles to share configuration information. In one embodiment, the services platform 113 and/or the services 115 interact with content providers 117a-117m who provide content data (e.g., map data, imaging data, etc.) to the services platform 113 and/or the services 115. In one embodiment, the UE 103 executes an application 119 that acts as client to the services platform 113, the services 115, the vehicle configuration module 105, and/or the vehicle configuration platform 107. In one embodiment, the sensor data, contextual information, and/or configuration information can be stored in the database 121 for use by the vehicle configuration module 105 and/or the vehicle configuration platform 107.

As described above, in one embodiment, the system 100 may be engaged to determine the vision capability information associated with a user. For example, this vision capability information may include occupant vision relative to environmental conditions, distance, or occupant line-of-sight with respect to the position within the vehicle. It may also include the processing and/or facilitating a processing of imaging data captured from one or more camera sensors of the at least one vehicle, mapping data, environmental information, contextual information, or a combination thereof. In one embodiment, the system 100 may prompt the occupant (e.g., via the application 119 and/or the vehicle configuration module 105) to input visibility information in several conditions, such as during a clear day, at night, during rain, or amidst fog. This input can be used as a calibration for image gathering devices, such as cameras, to maintain an estimated baseline for the occupant's line-of-sight or other vision capability information.

Figure 9A:
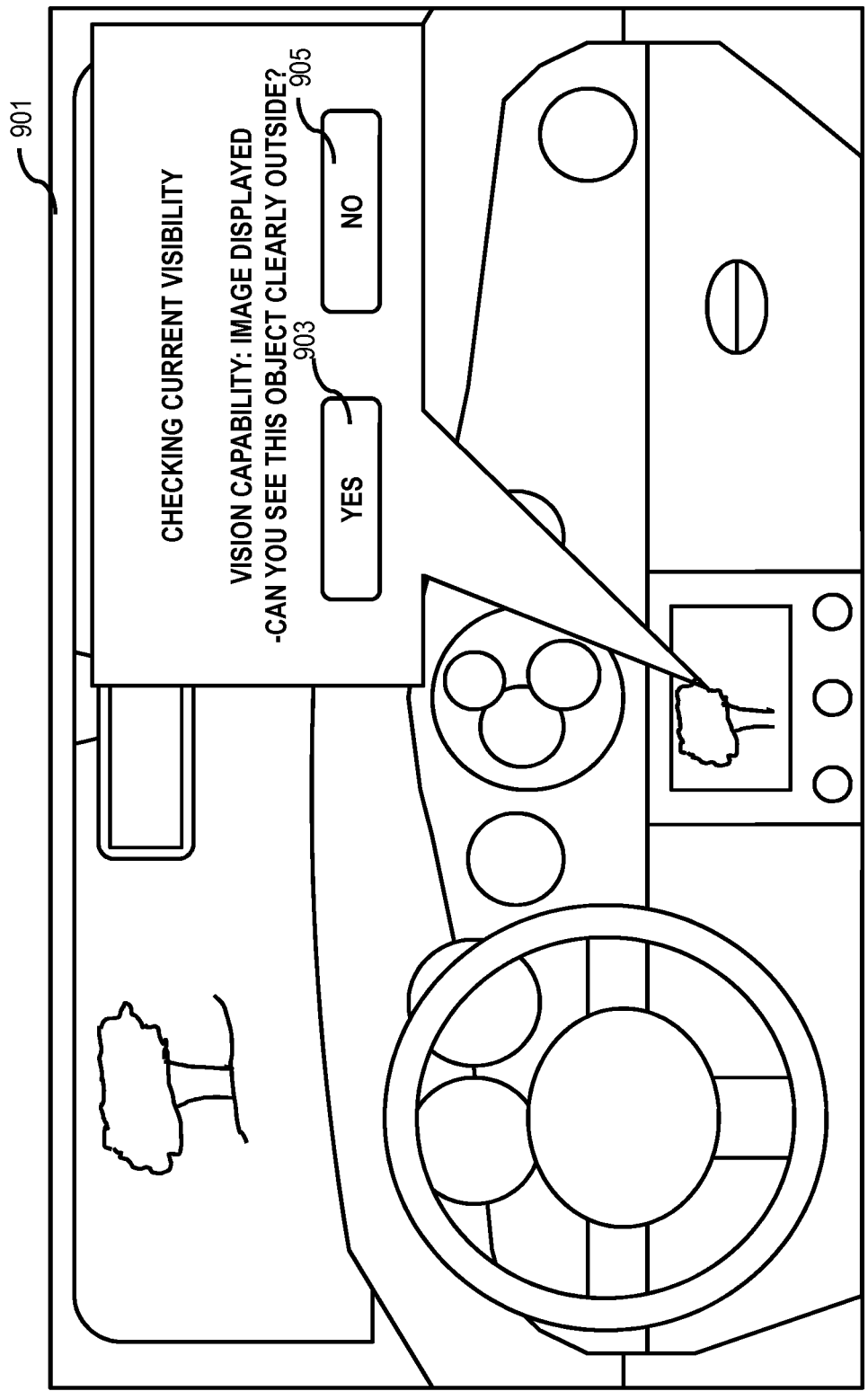
FIG. 9A is a user interface diagram that represents the calibration of user visibility according to on-board selection menus, according to one embodiment.
Figure 9:
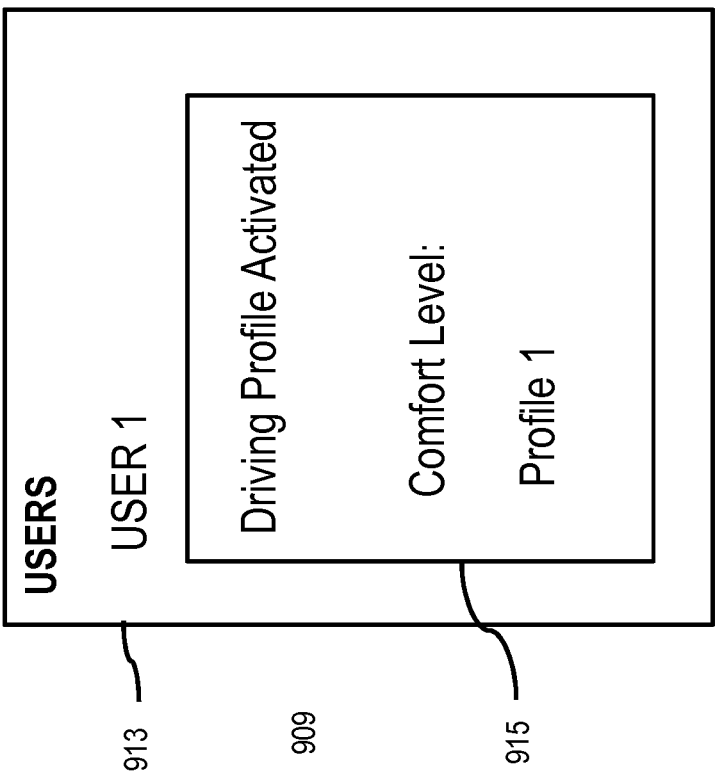
FIG. 9B is a user interface diagram that represents a user equipment display when the vehicle is performing according to the recommended operational configuration when operating only according to vehicle-based sensors, according to one embodiment.
FIG. 9C is a user interface diagram that represents a particular user's profile, according to one embodiment.
FIG. 9D is a user interface diagram that represents a user equipment display when the vehicle is performing according to the recommended operational configuration as influenced by user-based inputs, according to one embodiment.
Figure 9:
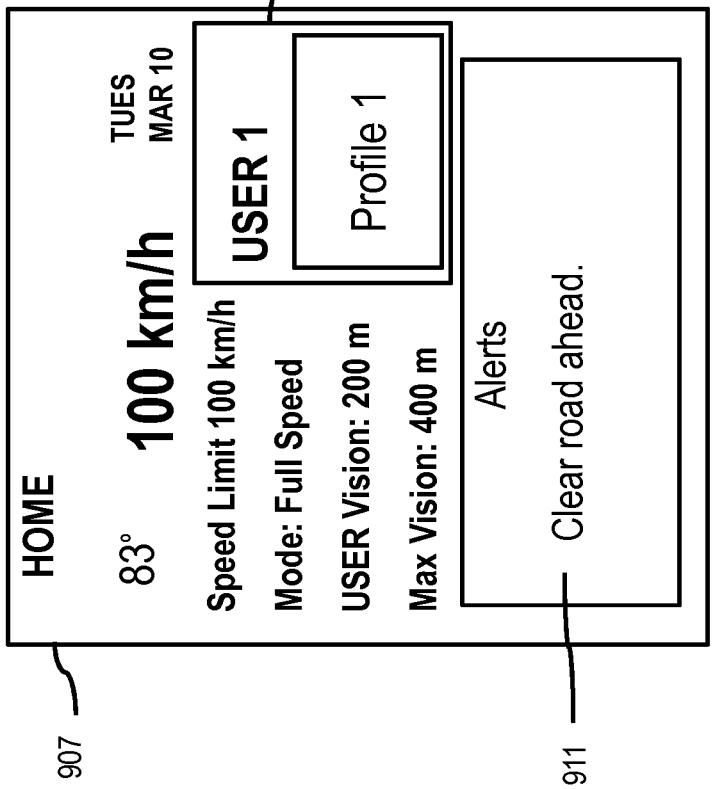

For example, a user may be traveling in the autonomous vehicle 101 to a location at night. The vehicle sensors 111 including such systems as lasers, radar, sonar, infrared, among other like sensors, can perceive the road equally as during the day and can likewise maintain the same speed characteristics based on the calculated maximum operational configuration. However, for the user, accelerating quickly or driving at a speed limit on a mountain road may be perceived as uncomfortable at night. Thus, the at least one user may input his/her perceived vision in particular weather and time-of-day conditions to calibrate the camera or image gathering devices/sensors. In one embodiment, this may be done using an on-board interactive display as shown in FIG. 9A, which can incorporate user data into the system 100 using selection algorithms. Therefore, the system 100, once calibrated, can automatically modify acceleration, braking, and/or speed parameters based on these inputs and determine a recommended operational configuration for a vehicle. In another embodiment, the system 100 may prompt the user to directly perceive contextual factors including particular objects, such as other vehicles, trees, buildings, landmarks, and other like structures to estimate the user vision capability, occupant location in the vehicle, and the resulting occupant line-of-sight. The system 100 can then compensate between the user perceived distance and the distances as perceived by vehicle image gathering devices, such as cameras, to achieve an estimated comfortable operational configuration for the at least one vehicle.

In one embodiment, the system 100 may assess vision capability information in terms of the occupant's line-of-sight. The at least one user may have a particular vantage point that limits their view of the road ahead. This line-of-sight information may be inputted into the system 100 manually or inputted as prompted by the user interface. The system 100 can then take account of this user line-of-sight as an aspect of vision capability in relation to other perceived aspects such as perceived distance and other like factors to generate an estimated comfortable operational configuration. In one scenario, the at least one occupant may perceive speed differently when sitting in a rear seat than when sitting in a front seat. The system 100 can then compensate the user's vision capability information for this change in line-of-sight when estimating a comfortable operational configuration. In another scenario, there may be at least one occupant in both the front seat(s) and the back seat(s). The system 100 may have an input that the occupants in the front seat have a greater discomfort for a particular speed than occupants of the back seat or vice versa. The system 100 can thus weight the relative lines-of-sight differently and further can calibrate and integrate this information with vehicle image gathering devices such as cameras to achieve the estimated comfortable operational configuration. As with several other embodiments, this estimated comfortable operational configuration can be compared with the maximum operational configuration generated by the vehicle sensors for the at least one vehicle to determine a recommended operational configuration.

In one embodiment, the system 100 may cause an updating of a recommended configuration based on user behavior and/or user inputs. The system 100 may already include various inputs related to occupant vision capability and line-of-sight as well as vehicle vision capability and line-of-sight to operate at a given recommended configuration. However, the at least one occupant may still be feeling some discomfort at the given recommended configuration as to alter or update the speed or acceleration characteristics. The update may be inputted manually, when prompted by the user interface, or as processed sensor data. The update may also be held in the user data base as feedback information to incorporate into future driving experiences. In one scenario, the system 100 may prompt the user to specify a particular comfort level associated with a recommended operational configuration. This specified comfort level thus results in an updated recommended configuration. In another scenario, sensor data related contextual information to the occupant's experience may be used such as camera data or data related to stressful behavior. This sensor data can thus be processed as feedback information to update the recommended operational configuration.

By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 103 is any type of embedded terminal, mobile terminal, fixed terminal, or portable terminal including a vehicle control unit, a head unit, a portable navigation device (PND), a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.).

By way of example, the autonomous vehicle 101, the UE 103, the vehicle configuration module 105, the vehicle configuration platform 107, the sensors 111, and the application 119 communicate with each other and with other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

By way of example, the sensors 111 may be any type of sensor to detect information about the environment surrounding the autonomous vehicle 101. In some embodiments, the sensor system 111 may include a laser rangefinder/LIDAR unit, a radar unit, infrared, an inertial measurement unit, an image gathering device such as a camera, or a microphone. The sensor system 111 may also include sensors configured to monitor internal systems of the autonomous vehicle 101 (e.g., O2 monitor, fuel gauge, engine oil temperature, wheel speed sensors, etc.). One or more of the sensors 111 may be configured to be actuated separately or collectively in order to modify a position and/or an orientation of the one or more sensors 111. In certain embodiments, the sensors 111 may include, for example, a global positioning sensor for gathering location data (e.g., GPS), a health sensor (e.g. heart-rate monitor, blood pressure monitor, etc.), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, and the like.

In one embodiment, the sensors 111 may include, light sensors, orientation sensors augmented with height sensor and acceleration sensor, tilt sensors to detect the degree of incline or decline of the vehicle along a path of travel, moisture sensors, pressure sensors, audio sensors (e.g., microphone), etc. In another example embodiment, the sensors 111 may detect weather data, passenger status (e.g., the number of passengers actively seated), etc. Further, sensors about the perimeter of the vehicle may detect the relative distance of the vehicle from sidewalks, lane or roadways, the presence of other vehicles, trees, benches, water, potholes and any other objects, or a combination thereof. Still further, the one or more sensors may provide in-vehicle navigation services, wherein one or more location based services may be provided to the at least one UE 103 associated with the at least one user of the vehicle and/or at least one other UE 103 associated with the autonomous vehicle 101.

In one embodiment, the vehicle configuration platform 107 may be a platform with multiple interconnected components. The vehicle configuration platform 107 may include multiple servers, intelligent networking devices, computing devices, components and corresponding software for determining a drop-off location, a pick-up location, or a combination thereof at a certain time period based, at least in part, on user fitness targets, user preferences, or a combination thereof.

Figure 2:
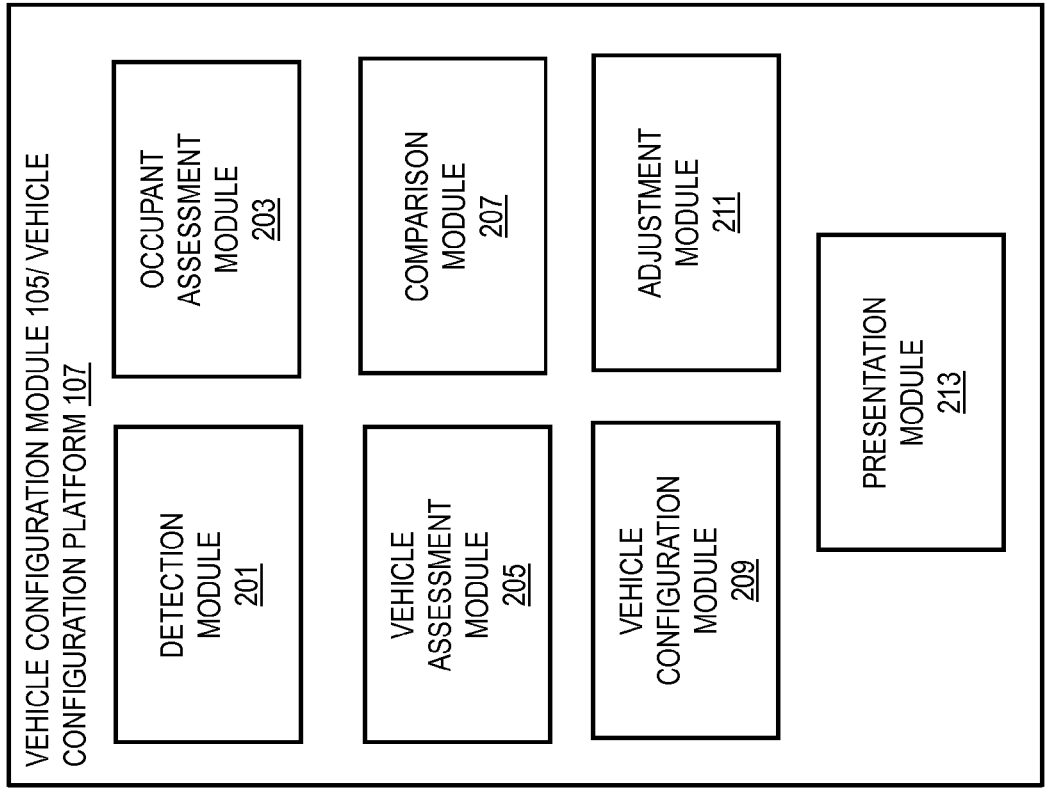
FIG. 2 is a diagram of the components of a vehicle configuration module/vehicle configuration platform, according to one embodiment.

FIG. 2 is a diagram of the components of a vehicle configuration module 105/vehicle configuration platform 107, according to one embodiment. By way of example, the vehicle configuration module 105/vehicle configuration platform 107 include one or more components for determining a recommended operational configuration for the at least one occupant. It is contemplated that the functions of these components may be combined in one or more components or performed by other components of equivalent functionality. In one embodiment, the vehicle configuration module 105/vehicle configuration platform 107 include a detection module 201, an occupant assessment module 203, a vehicle assessment module 205, a comparison module 207, a vehicle configuration module 209, an adjustment module 211, and a presentation module 213.

In one embodiment, the detection module 201 includes a system integrated with vehicle image gathering devices and sensors 111 for correlating or comparing image or sensor data with at least one occupant's vision capability and line-of-sight. The vision related data can be gathered from an image gathering device or devices, such as cameras, and processed via the occupant assessment module 203 to provide an estimated comfortable configuration with commensurate speed, acceleration, braking and other like characteristics. In addition, the system may be integrated with one or more advanced detection methods that employ sensors, such as lasers, radar, sonar, infrared and other like techniques, to maximize the autonomous system's assessment of the contextual environment. This detection module 201 may be further modified with user preferences and tolerances, which, in part, provide a personalized speed or operational configuration.

In one embodiment, the occupant assessment module 203 includes an integrated system for evaluating user preferences based on the at least one occupant's vision capability and line-of-sight. Such vision related data can be inputted manually, prompted by an application 119, or gathered from an image gathering device or devices such as cameras incorporated into the detection module 201 and processed via the occupant assessment module 203 to provide an estimated comfortable configuration with commensurate speed, acceleration, braking and other like characteristics. This comfortable configuration may be further modified with user preferences and tolerances, which, in part, provide a personalized speed based on both visibility and comfort related parameters.

In multiple embodiments, the vehicle assessment module 205 provides a maximum configuration by evaluating the road conditions based on the autonomous vehicle system. This autonomous system includes one or more advanced detection methods that employ sensors such as that utilize lasers such as lidar, radar, sonar, infrared and other like techniques incorporated into the detection module 201 and integrated with the processes of the vehicle assessment module 205. This vehicle assessment module 205 can be further integrated with 3-D map data, communication networks, weather reports, and real-time information from other vehicles. This integration with processors can provide a calculation for a maximum operational configuration, which is determined to be safe by the assessment of these advanced sensors and network information, and which relies on sensors with greater resolution and perception capabilities than the human visual and sensory systems.

In multiple embodiments, the comparison module 207 will process the outputted information of the occupant assessment module 203 and vehicle assessment module 205, respectively. The occupant assessment module 203 and vehicle assessment modules 205 calculate a configuration using different methodologies, and each distinctly may not achieve the best driving result in terms of an optimized balance of comfort and efficiency. Therefore, the vehicle configuration platform 107 includes a comparison module 207 to evaluate the occupant assessment module 203 and vehicle assessment module 205 modules and give each a relative weight using inputted data, algorithms, and process formats to calculate a recommended operational configuration, which can be outputted via the vehicle configuration module 209 to provide a more humanized driving experience.

In multiple embodiments, the vehicle configuration module 209 determines a recommended operation configuration based on the comparison module 207, which evaluates the occupant assessment module 203 and vehicle assessment modules 205, respectively. To make this recommendation, numerous inputs may be applicable including personal preferences, network data, sensor inputs, or real-time data and other like inputs. Furthermore, the vehicle configuration module 209 can incorporate feedback information via the adjustment module 211.

In multiple embodiments, the adjustment module 211 evaluates feedback information to provide adjustments for the vehicle configuration module 209 that results in an adjustment or updating of the recommended operational configuration for the at least one occupant. This feedback might include user inputs through an application 103 of a user interface such as to specify a particular comfort level. Or, the adjustment module 211 may provide feedback to the vehicle configuration module 209 by including data related to updated or real-time vision capability information or updated occupant comfort data. Such aforementioned information may be presented and interfaced to the at least one occupant via the presentation module 213.

Figure 3:
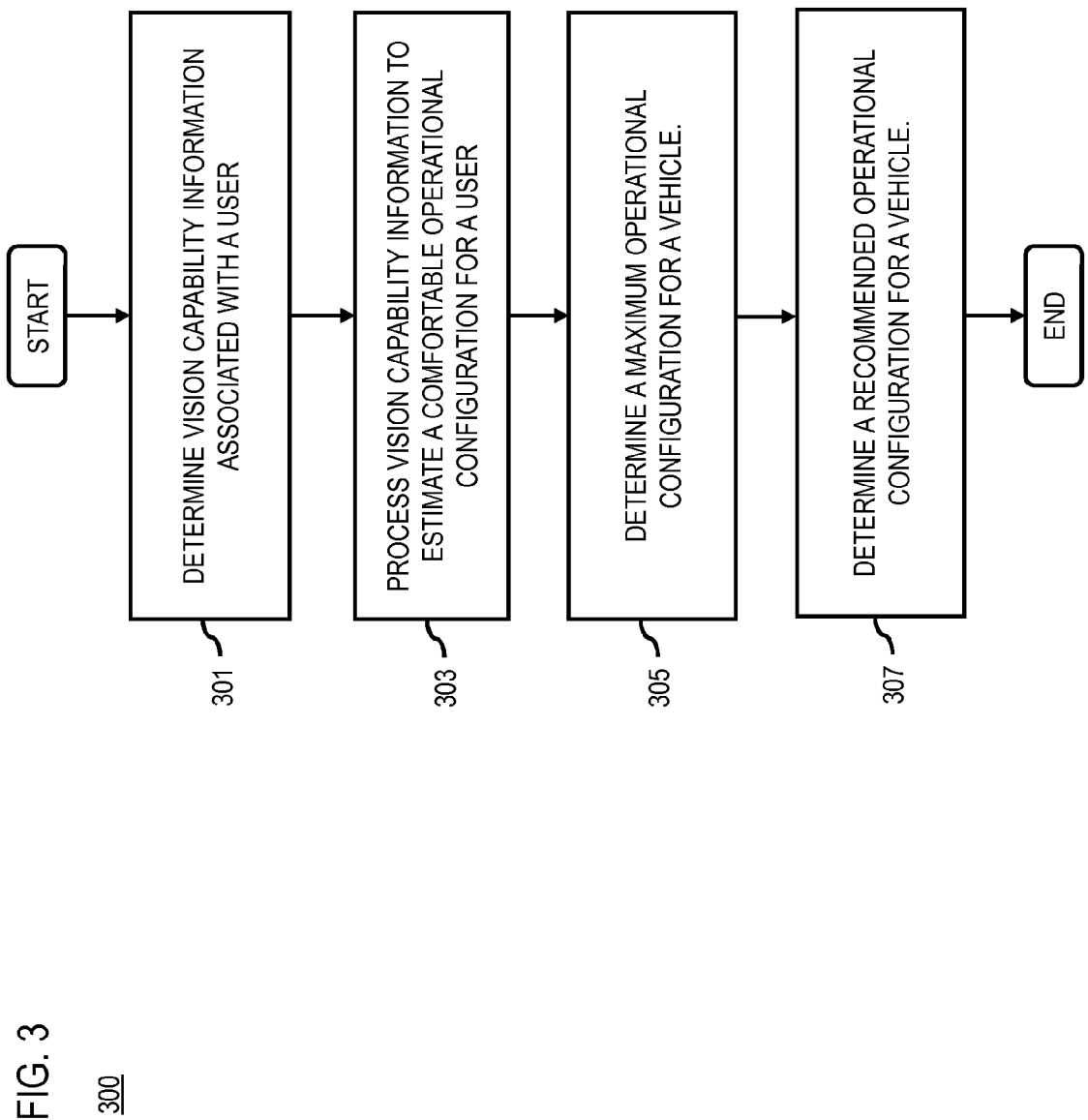
FIG. 3 is a flowchart of a process for determining a recommended operational configuration, based on a comfortable operational configuration and a maximum operational configuration, according to one embodiment.
Figure 11:
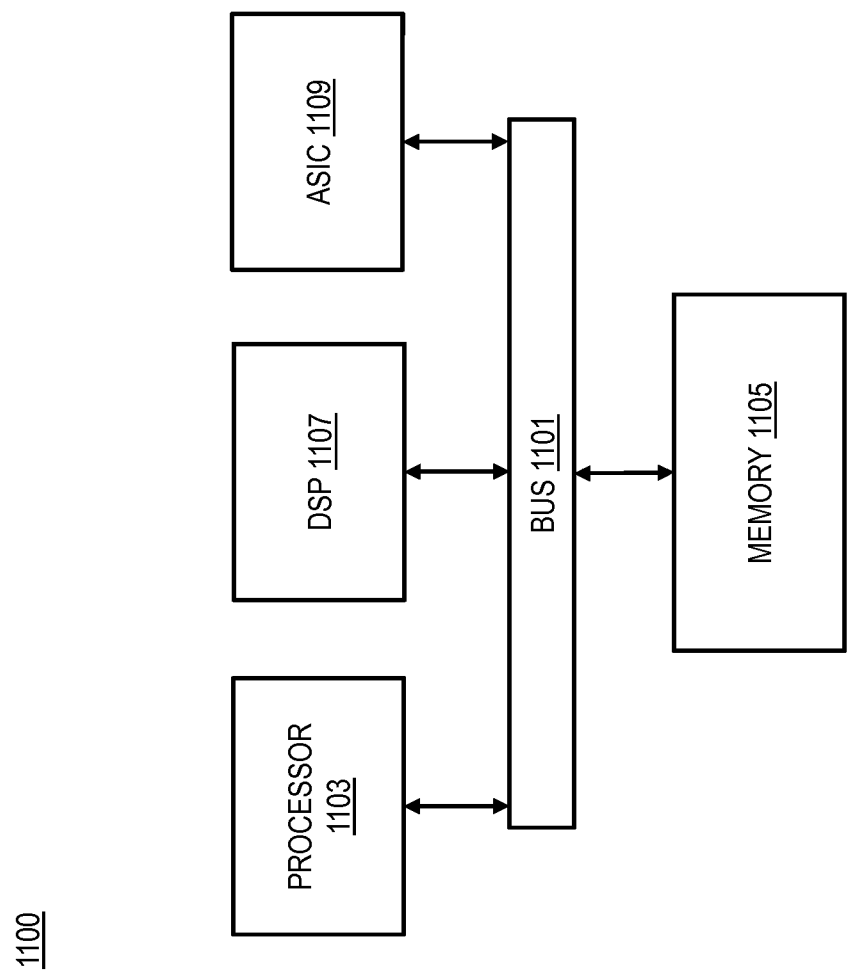
FIG. 11 is a diagram of a chip set that can be used to implement an embodiment of the invention, according to one embodiment.

FIG. 3 is a flowchart of a process for determining a recommended operational configuration, based on a comfortable operational configuration and a maximum operational configuration, according to one embodiment. In one embodiment, the recommended operational configuration is determined by assessing a vision capability for the at least one user in order to estimate a comfortable operational configuration compatible with user comfort and also determining a maximum operational configuration commensurate with the speed and acceleration capacity of the vehicle, according to one embodiment. In one embodiment, the vehicle configuration platform 107 performs the process 300 and is implemented in, for instance, a chip set including a processor and a memory as shown in FIG. 11. In addition or alternatively, the vehicle configuration module 105 can perform all or a portion of the process 300.

In step 301, the vehicle configuration platform 107 may determine vision capability information associated with a user. The vision capability information is evaluated using a variety of techniques including assessing the occupant's visibility and line-of-sight using on-board systems to measure visibility, line-of-sight, and comfort perception using an interactive application 119 or using integrated sensors or image gathering devices such as cameras 111.

In step 303, the vehicle configuration platform 107 may process vision capability information to estimate a comfortable operational configuration for a user. In one embodiment, an estimated comfortable operational configuration may be calibrated using one or more of a number of factors including user vision, visibility, line-of-sight and preferences related to contextual information such as the time of day, location, or weather information to estimate an overall comfortable and humanized driving experience. In another scenario, these factors may be assessed in conjunction with vehicle image gathering devices, such as cameras, sensors, and/or other like techniques.

In step 305, the vehicle configuration platform 107 may determine a maximum operational configuration for a vehicle in accordance with the performance capabilities of an autonomous vehicle system. In one embodiment, these capabilities can be determined by evaluating speed and acceleration characteristics in conjunction with map data, communication networks, weather reports, real-time information from other vehicles, or advanced sensor systems including lasers, radar, infrared, and other like sensors; or a combination thereof.

In step 307, the vehicle configuration platform 107 may determine a recommended operational configuration for a vehicle. In one embodiment, the recommended operational configuration may be more heavily weighted toward the comfortable operational configuration, in cases where the vision capability is low and/or is given high priority. Furthermore, priority may be given to the comfortable operational configuration in conditions that preference vision capability data or other user inputs. Such conditions may comprise harsh weather driving, night-time driving, driving around severe curves, other user determined conditions, and other like conditions. In one embodiment, the recommended operational configuration may be more heavily weighted toward the maximum operational configuration, in cases where the vision capability is high and/or is given low priority. Furthermore, priority may be given to the maximum operational configuration in conditions that conform to the user preference for the maximum operational configuration, such as in good weather and/or on straight and open highways.

Figure 4:
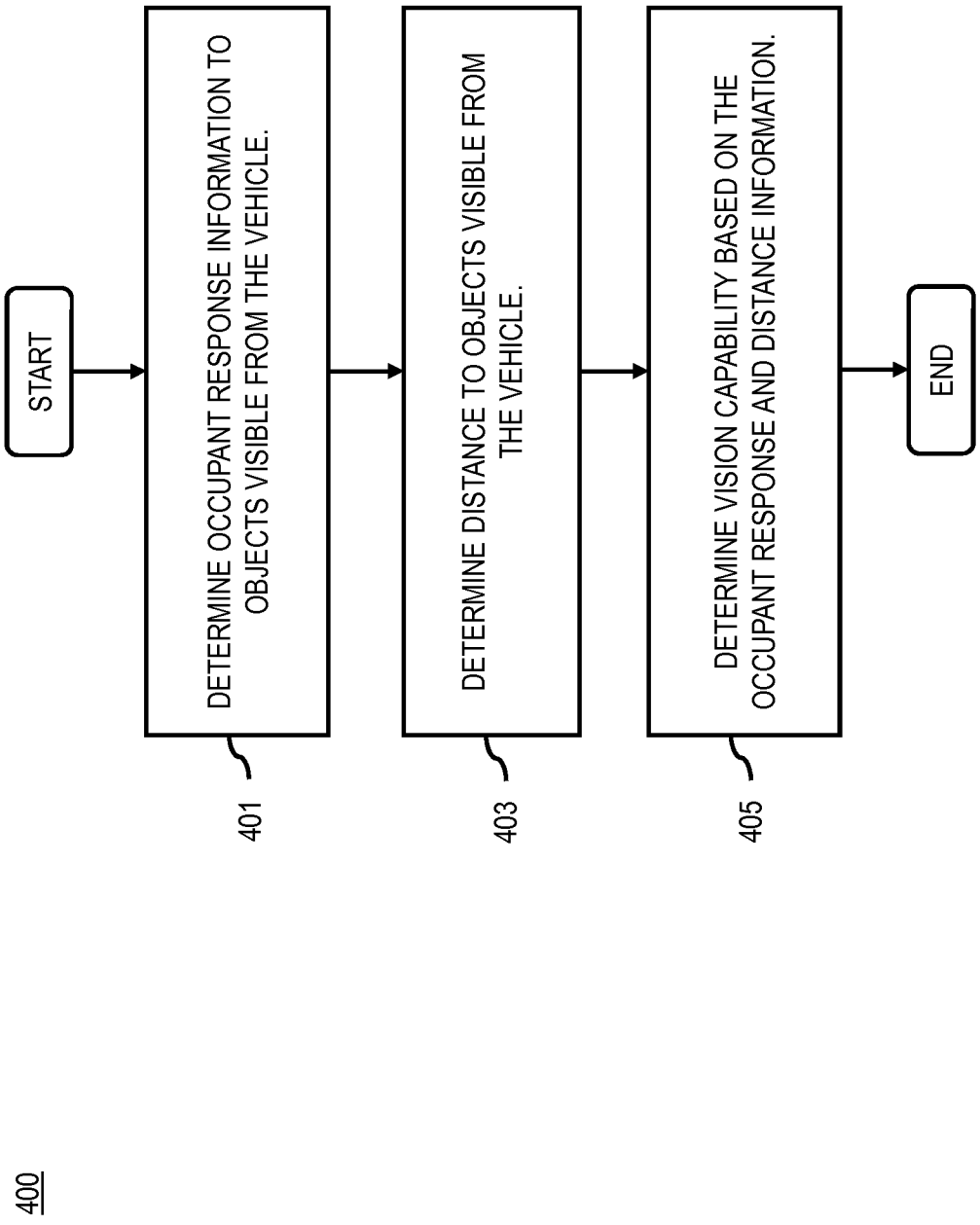
FIG. 4 is a flowchart of a process for determining the vision capability information based, at least in part, on the occupant response information, the distance information, or a combination thereof, according to one embodiment.

FIG. 4 is a flow chart of a process to determine vision capability based on occupant response to distance information, sensor or camera determined distance information, or a combination of the two, according to one embodiment. In one embodiment, the vehicle configuration platform 107 performs the process 400 and is implemented in, for instance, a chip set including a processor and a memory as shown in FIG. 11. In addition or alternatively, the vehicle configuration module 105 can perform all or a portion of the process 400.

In step 401, the vehicle configuration platform 107 may determine occupant response information to objects visible from the vehicle. In one embodiment, a user interface may prompt the user to directly perceive contextual factors including particular objects, such as other vehicles, trees, buildings, landmarks, and other like structures to estimate the user vision capability. Other factors including occupant location in the vehicle, and the resulting occupant line-of-sight may also be included.

In step 403, the vehicle configuration platform 107 may determine distance to objects visible from the vehicle. In one embodiment, image gathering devices, such as camera and/or sensors determine distance information related to particular objects, such as other vehicles, trees, buildings, landmarks, and other like structures. Other factors including occupant location in the vehicle, and the resulting occupant line-of-sight may also be included.

In step 405, the vehicle configuration platform 107 may determine vision capability based on the occupant response and distance information. In one embodiment, the vehicle configuration platform 107 can compensate between the user perceived distance and the distances as perceived by vehicle image gathering devices, such as cameras and/or sensors, to achieve a vision capability based on the occupant response and distance information for the at least one vehicle. In one scenario, the at least one user may input his/her perceived vision in particular condition, such as weather conditions or time-of-day conditions to calibrate the camera or image gathering devices or sensors. This may be performed using an on-board interactive display as shown in FIG. 9A, which can incorporate user data into the system 100 using selection algorithms. Thus, this process 400 can be used to gauge the at least one occupant vision capability via the vehicle configuration platform 107 to calibrate the on-board image gathering devices or cameras in order to maintain a real-time analysis of the at least one occupant vision capability information.

Figure 5:
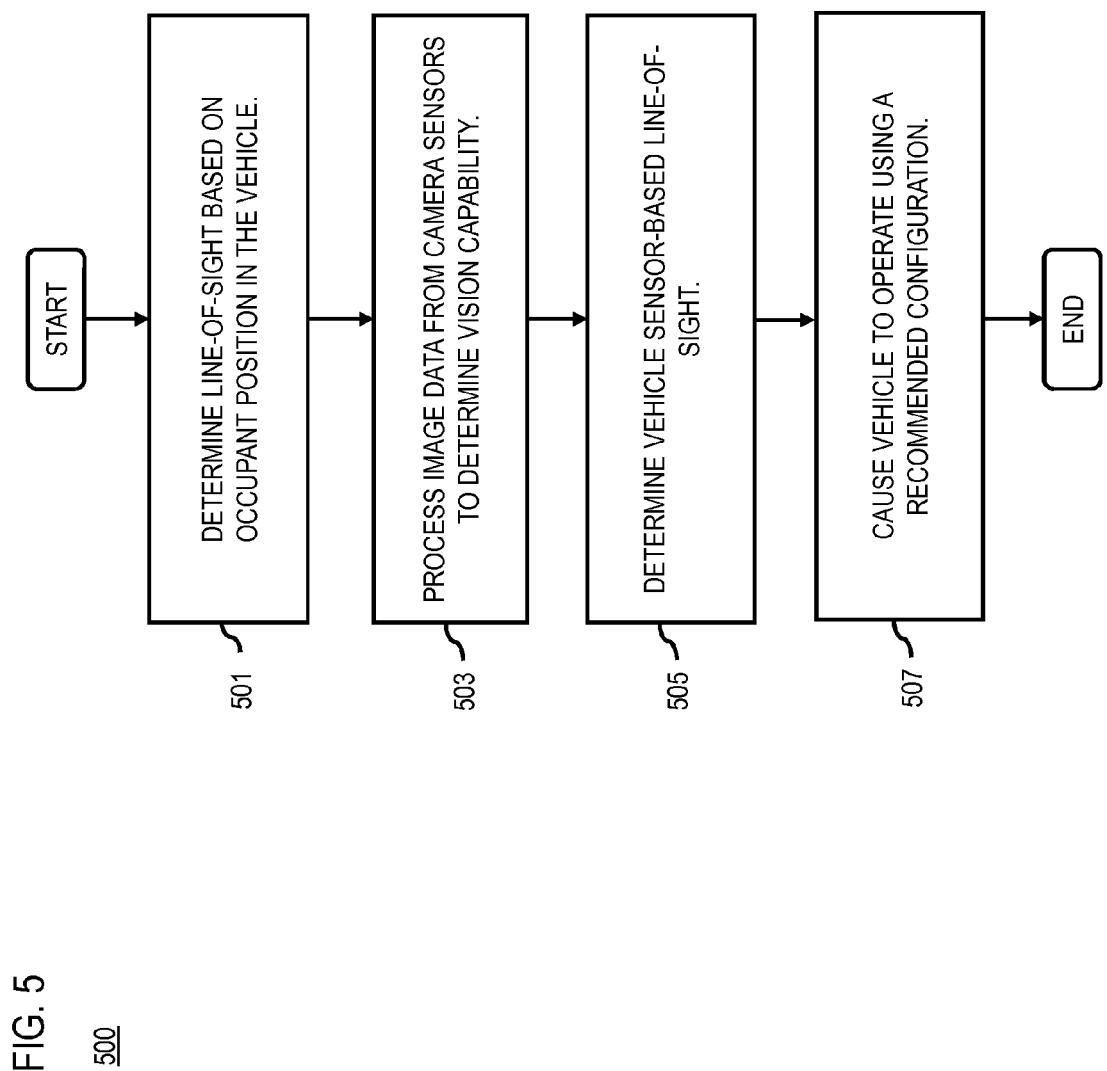
FIG. 5 is a flowchart of a process for causing the vehicle to operate using the recommended operational configuration based on occupant line-of-sight information, the processing of imaging data, and vehicle sensor-based line-of-sight information, according to one embodiment.

FIG. 5 is a flowchart of a process for causing the vehicle to operate using the recommended operational configuration based on occupant line-of-sight information, the processing of imaging data, and vehicle sensor-based line-of-sight information, according to one embodiment. In one embodiment, the vehicle configuration platform 107 performs the process 500 and is implemented in, for instance, a chip set including a processor and a memory as shown in FIG. 11. In addition or alternatively, the vehicle configuration module 105 can perform all or a portion of the process 500.

In step 501, the vehicle configuration platform 107 may determine line-of-sight based on occupant position in the vehicle. In one embodiment, the vantage point of the at least one vehicle occupant is taken into account including blind spots and limits of the occupant view of the road. This line-of-sight information may be inputted manually or inputted as prompted by the user interface. This user-based line-of-sight in considered as an aspect of vision capability in relation to other aspects such as perceived distance and other like factors to generate an estimated comfortable operational configuration. In one scenario, the at least one occupant may perceive speed differently when sitting in a rear seat than when sitting in a front seat. The vehicle configuration platform 107 can then compensate the user's vision capability information for this change in line-of-sight when estimating a comfortable operational configuration. In another scenario, there may be at least one occupant in both the front seat(s) and the back seat(s). The vehicle configuration platform 107 may have an input that the occupants in the front seat have a greater discomfort for a particular speed than occupants of the back seat or vice versa.

In step 503, the vehicle configuration platform 107 may process image data from camera sensors to determine vision capability. In one embodiment, the vehicle configuration platform 107 can thus weight the relative lines-of-sight differently and further can calibrate and integrate this information with vehicle image gathering devices such as cameras or sensors 111 to achieve an estimated comfortable operational configuration. As with several other embodiments, this estimated comfortable operational configuration can be compared with the maximum operational configuration generated by the vehicle sensors for the at least one vehicle to determine a recommended operational configuration.

In step 505, the vehicle configuration platform 107 may determine vehicle sensor-based line-of-sight. In one embodiment, the vehicle configuration platform 107 provides a maximum configuration by evaluating the road conditions based on the autonomous vehicle system. These autonomous functions are integrated with one or more advanced detection methods that employ sensors 111 such as that utilize lasers such as lidar, radar, sonar, infrared and other like techniques. In one embodiment, the vehicle configuration platform 107 can be further integrated with 3-D map data, communication networks, weather reports, and real-time information from other vehicles. This integration with processors can provide a calculation for a maximum operational configuration, while not necessary optimal for user comfort, is determined to be safe by the assessment of these advanced sensors and network information, and which relies on sensors with greater resolution and perception capabilities than the human visual and sensory systems.

In step 507, the vehicle configuration platform 107 may cause the vehicle to operate using a recommended configuration. In one embodiment, this step in the process of FIG. 5 is analogous to that shown in FIG. 3 and includes the assessment of the at least one occupant line-of-sight integrated with image data to determine vision capability. In one embodiment, this vision capability information may be processed further to determine an estimated comfortable operational configuration as shown in FIG. 3. This estimated comfortable operational configuration is compared with the vehicle sensor based visibility and line-of-sight by the vehicle configuration platform 107 to determine a recommended operational configuration.

Figure 6:
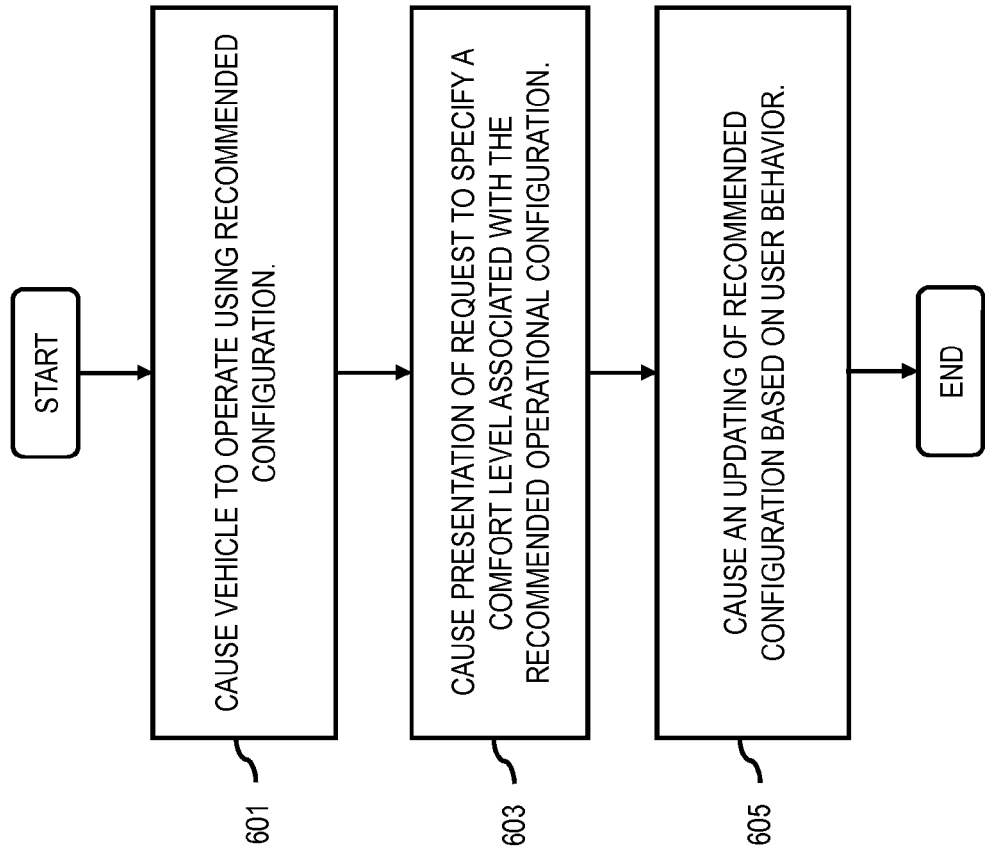
FIG. 6 is a flowchart for updating the recommended configuration by adjusting the comfort level, according to one embodiment.

FIG. 6 is a flowchart for updating the recommended configuration by adjusting the comfort level, according to one embodiment. In one embodiment, the vehicle configuration platform 107 performs the process 600 and is implemented in, for instance, a chip set including a processor and a memory as shown in FIG. 11. In addition or alternatively, the vehicle configuration module 105 can perform all or a portion of the process 600.

In step 601, the vehicle configuration platform 107 may cause the vehicle to operate using the recommended configuration. In one embodiment, the calculation of a recommended configuration can be in accord with the processes of FIGS. 3-5. Furthermore, the recommended configuration may have been previously updated as will be further explained.

In step 603, the vehicle configuration platform 107 may cause a presentation of a request to specify a comfort level associated with the recommended operational configuration. In one embodiment, this process may be employed when the at least one occupant may still be feeling some discomfort, dissatisfaction with the speed or acceleration, or another like reason at the given recommended configuration as to alter or update the speed or acceleration characteristics. The update may be inputted manually, when prompted by the user interface, or as processed data. The update may also be held in the user data base as feedback information to incorporate into future driving experiences.

In step 605, the vehicle configuration platform 107 may cause an updating of a recommended configuration based on user inputs and behavior. According to one embodiment, as described, this process 600 includes the updating of a previous recommended configuration 601 by causing a presentation of a request to specify a comfort level associated with a recommended operational configuration.

Figure 7:
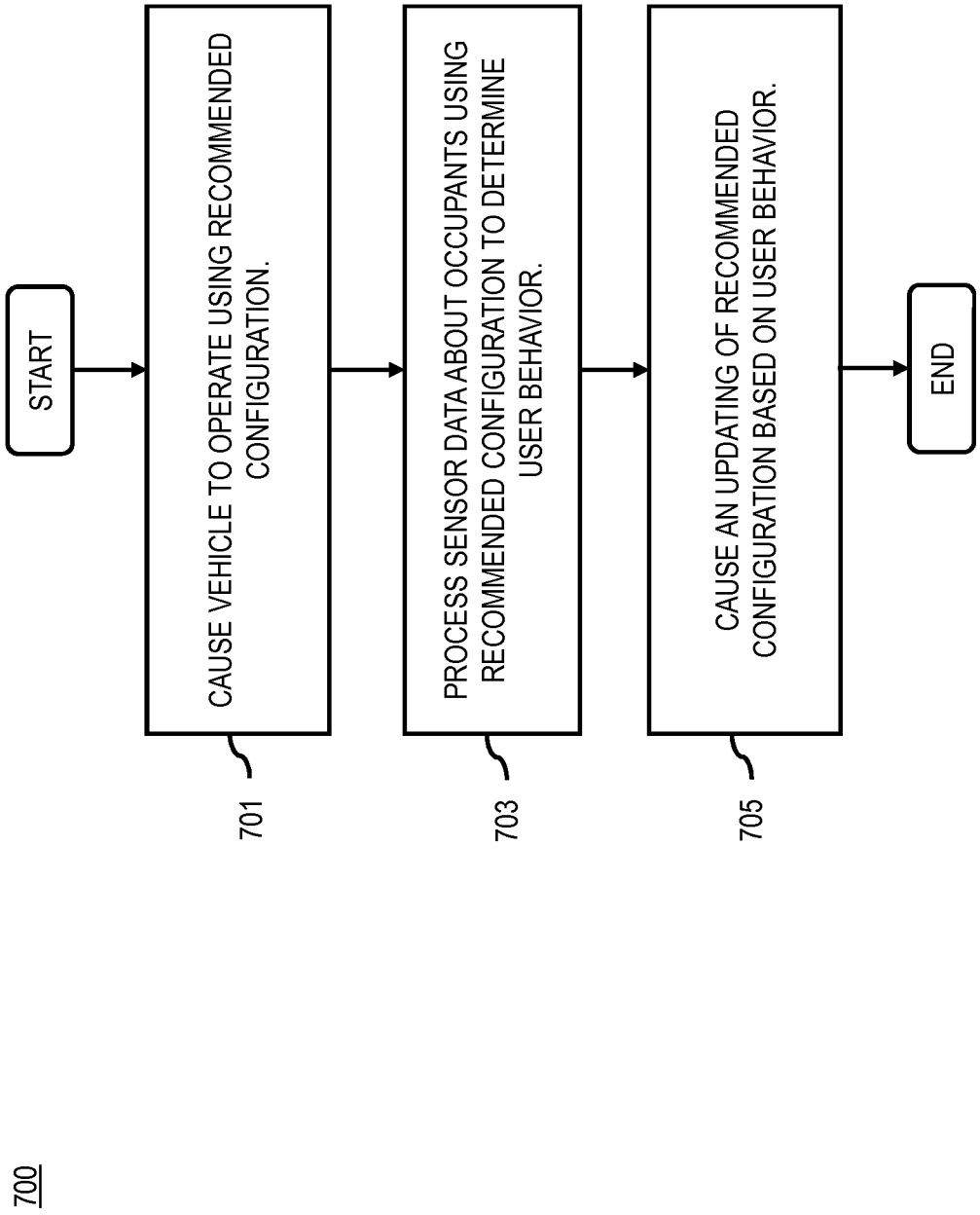
FIG. 7 is a flowchart for updating the recommended configuration by processing sensor data of user behavior, according to one embodiment.

FIG. 7 is a flowchart for updating the recommended configuration by adjusting the comfort level, according to one embodiment. In one embodiment, the vehicle configuration platform 107 performs the process 700 and is implemented in, for instance, a chip set including a processor and a memory as shown in FIG. 11. In addition or alternatively, the vehicle configuration module 105 can perform all or a portion of the process 700.

In step 701, the vehicle configuration platform 107 may cause the vehicle to operate using the recommended configuration. In one embodiment, the calculation of a recommended configuration can be in accord with the processes of FIGS. 3-5. Furthermore, the recommended configuration may have been previously updated as will be further explained.

In step 703, the vehicle configuration platform 107 may process sensor data about occupants using a recommended operational configuration to determine user behavior, according to one embodiment. This process may be employed when the at least one occupant may still be feeling some discomfort, dissatisfaction with the speed or acceleration, or another like reason at the given recommended configuration as to alter or update the speed or acceleration characteristics. The update may be inputted manually, when prompted by the user interface, or as processed sensor data. Such sensor data may include information about the occupants past driving habits, real-time user characteristics, or contextual information related to user behavior. The update may also be held in the user data base as feedback information to incorporate into future driving experiences.

In step 705, the vehicle configuration platform 107 may cause an updating of a recommended configuration based on user inputs and behavior. As described, this process 700 includes the updating of a previous recommended configuration by causing a presentation of a request to specify a comfort level associated with a recommended operational configuration 703, according to one embodiment. These steps may be performed using an on-board interactive display, such as shown in FIGS. 9A-D, which can incorporate user data into the system 100 using selection algorithms.

Figure 8:
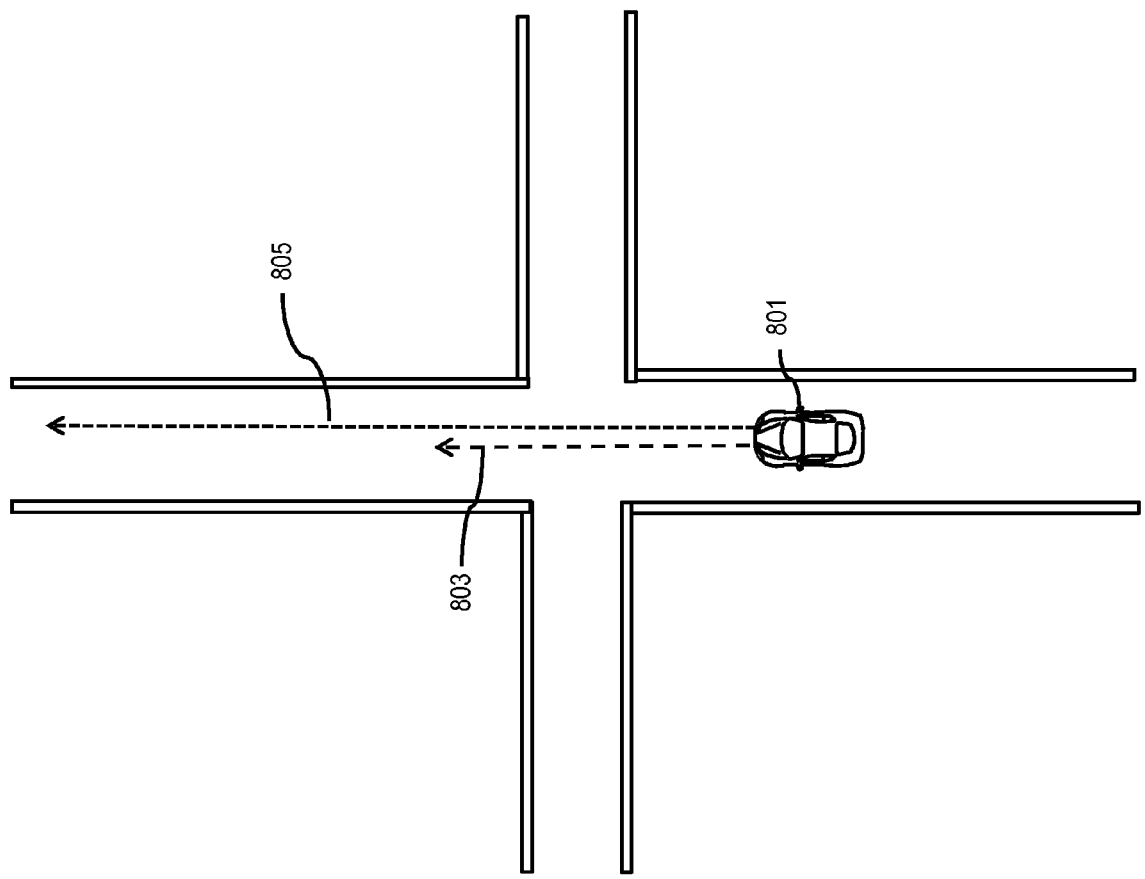
FIG. 8 is an illustration of an occupant vision capability as compared with maximum visibility of vehicle sensors, according to one embodiment.

FIG. 8 is an illustration of an occupant vision capability as compared with maximum visibility of vehicle sensors, according to one embodiment. FIG. 8 shows multiple lines-of-sight 803, 805 for a vehicle 801, which can be used in the process of determining a recommended operational configuration by the processes of FIGS. 3-7, according to several embodiments. In one scenario, the line-of-sight of image gathering devices or cameras 803 may be calibrated to accurately assess user vision capability information and include a more limited distance perception than that line-of-sight achieved by the vehicle sensor systems 805. These two lines-of-sight or vision capabilities can be compared via the comparison module 207 to give a recommended operational configuration via the vehicle configuration module of FIG. 2.

FIGS. 9A-9D are user interface diagrams utilized in the processes of FIGS. 3-7, according to multiple embodiments. These interfaces are examples of possible interfaces that may be compatible with the current system as described in FIGS. 1-8, and which may include such options as selection menus of, for example, personal profile details, information on networks that are utilized, options related to control of the vehicle, such as autonomous relative to manual under various conditions, and other like options may be included. Such options may further include selection menus of, for example, visibility and comfort options, driving habit statistics to assess past driving habits, locations of interest information, such as uncomfortable driving roads or, contrariwise, scenic or advantageous routes, and other like options may be included.

FIG. 9A is a user interface diagram that represents the calibration of user visibility according to on-board selection menus, according to one embodiment. In one scenario, the user interface diagram includes an on-board vehicle assessment [901] for comparing the at least one occupant vision and line-of-sight characteristics with image gathering devices, such as cameras or sensors, using selection menus [903, 905]. Such a process is also described in FIG. 5.

FIG. 9B is a user interface diagram that represents a user equipment display when the vehicle is performing according to the recommended operational configuration when operating only according to vehicle-based sensors, according to one embodiment. The user interface [907] includes a number of parameters of possible interest including the outside conditions, speed, visibility according to image gathering devices, such as cameras, to gauge user vision, and the visibility according to the maximum vision capabilities of the autonomous system including advanced sensor systems. These parallel systems provide the user with a recommended operational configuration based on user inputs and system algorithms as described in FIGS. 3-7. The interface may also display the particular user profile [909] and alerts [911] for the at least one occupant.

FIG. 9C is a user interface diagram that represents a particular user's profile, according to one embodiment. This profile [913] may include numerous personalized parameters [915] for the estimated comfortable configuration as described as a component of a recommended operational configuration, according to several embodiments.

Figure 9D:
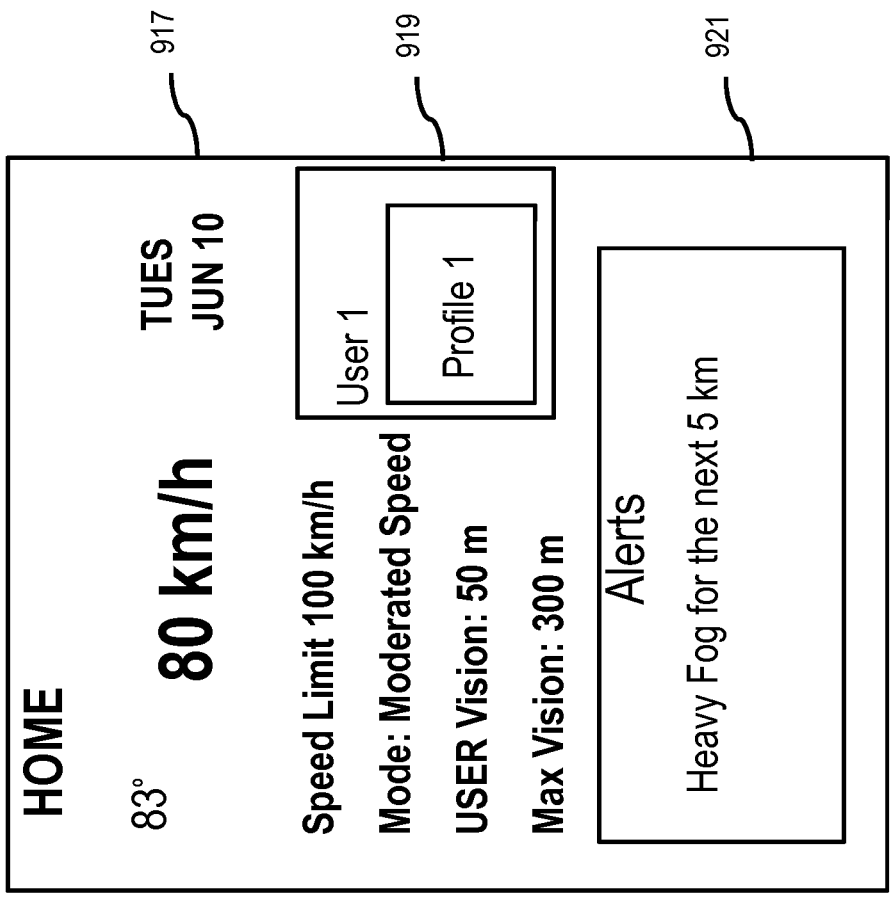

FIG. 9D is a user interface diagram that represents a user equipment display when the vehicle is performing according to the recommended operational configuration as influenced by user-based inputs, according to one embodiment. The user interface [917] includes a number of parameters of possible interest including the outside conditions, speed, visibility according to image gathering devices, such as cameras, to gauge user vision, and the visibility according to the maximum vision capabilities of the autonomous system including advanced sensor systems. These parallel systems provide the user with a recommended operational configuration based on user inputs and system algorithms as described in FIGS. 3-7. The interface may also display the particular user profile [919] and alerts [921] for the at least one occupant.

The processes described herein for determining a recommended operational configuration may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
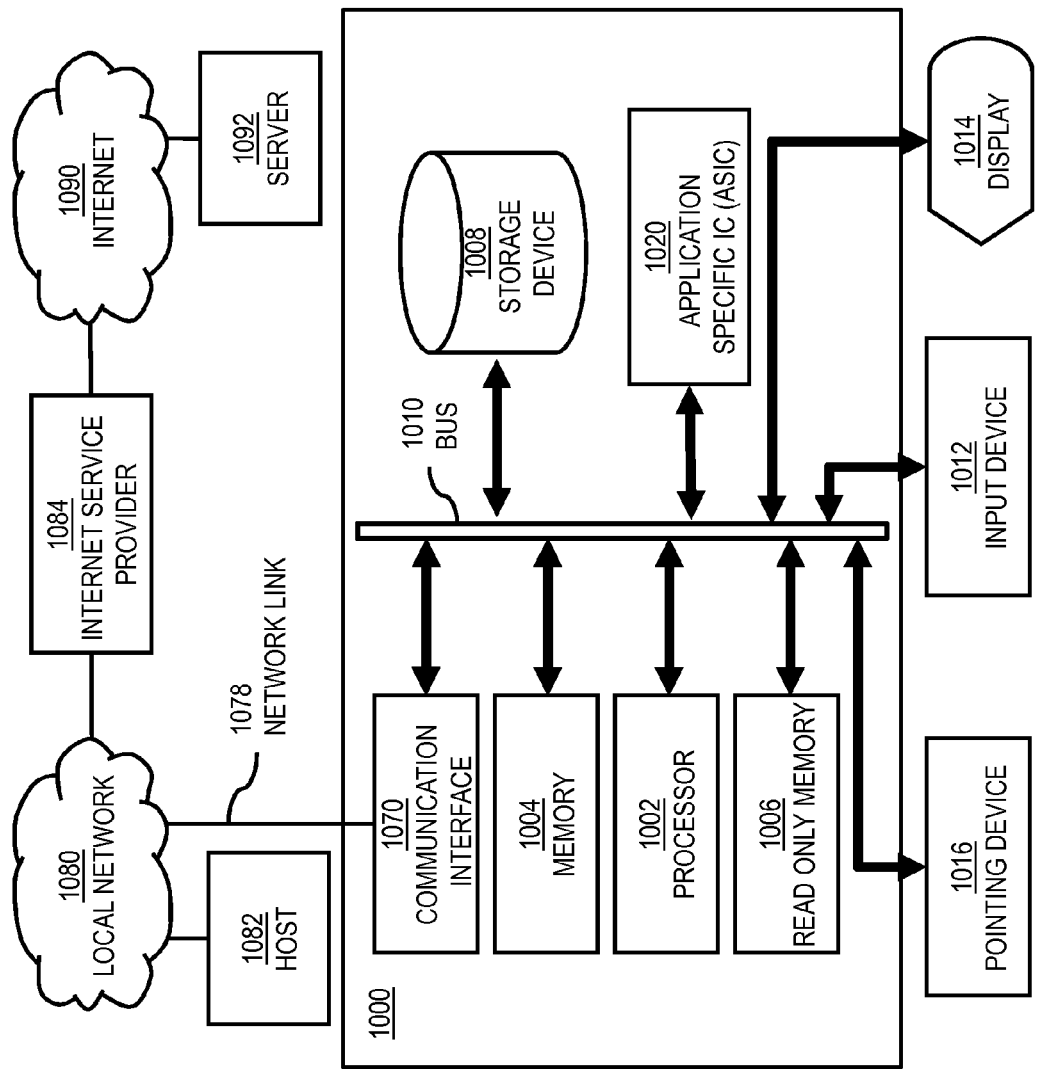
FIG. 10 is a diagram of hardware that can be used to implement an embodiment of the invention, according to one embodiment.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to determining a recommended operational configuration as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of determining a recommended operational configuration.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to determining a recommended operational configuration. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for determining a recommended operational configuration. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining a recommended operational configuration, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for determining a recommended operational configuration to the UE 103.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to determining a recommended operational configuration as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing an operational configuration for a vehicle.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determining a recommended operational configuration. The memory 1105 also stores the data associated with or generated by the execution of the inventive steps.

Figure 12:
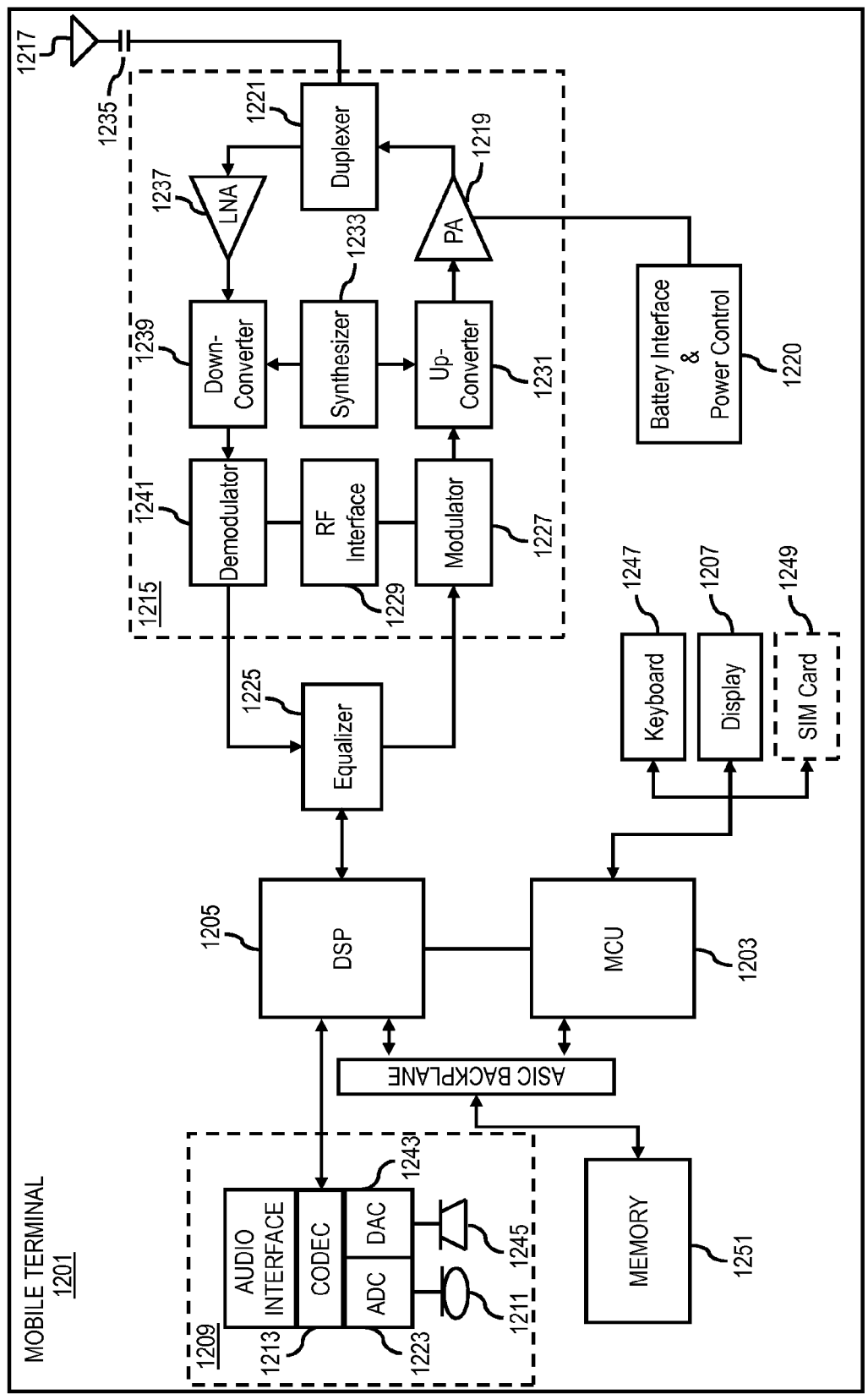
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of determining a recommended operational configuration. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of determining a recommended operational configuration. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC)

1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to determining a recommended operational configuration. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining user vision capability information for one or more occupants of at least one vehicle,
   wherein the user vision capability information is based on assessment of vision perception of the one or more occupants relative to contextual environment;
   processing and/or facilitating a processing of the user vision capability information to determine an estimated comfortable operational configuration for the at least one vehicle;
   determining a maximum operational configuration for the at least one vehicle; and
   determining a recommended operational configuration for the at least one vehicle based, at least in part, on the estimated comfortable operational configuration and the maximum operational configuration.

2. A method of claim 1, further comprising:
   determining occupant line-of-sight information for the one or more occupants with respect to their position within the at least one vehicle,
   wherein the user vision capability information is based, at least in part, on the line-of-sight information.

3. A method of claim 1, further comprising:
   processing and/or facilitating a processing of imaging data captured from one or more camera sensors of the at least one vehicle, mapping data, environmental information, contextual information, or a combination thereof to determine the user vision capability information.

4. A method of claim 3, wherein the contextual information relates to the one or more occupants; the at least one vehicle; at least one travel segment traveled by the at least one vehicle; one or more objects within proximity of the at least one vehicle, the at least one travel segment, or a combination thereof.

5. A method of claim 1, further comprising:
   determining vehicle sensor-based line-of-sight information, vehicle capability information, posted maximum configuration information for a travel segment, or a combination thereof to determine the maximum operational configuration.

6. A method of claim 1, further comprising:
   determining occupant response information to one or more objects visible from the at least one vehicle;
   determining distance information to the one or more objects; and
   determining the user vision capability information based, at least in part, on the occupant response information, the distance information, or a combination thereof.

7. A method of claim 1, further comprising:
   causing, at least in part, a configuration of the at least one vehicle to operate using the recommended operational configuration.

8. A method of claim 1, further comprising:
   causing, at least in part, a presentation of at least one request to the one or more occupants to specify a comfort level associated with operating the at least one vehicle using the recommended operational configuration.

9. A method of claim 1, further comprising:
   processing and/or facilitating a processing of sensor data about the one or more occupants during an operation of the at least one vehicle using the recommended operational configuration to determine user behavioral information; and
   causing, at least in part, an updating of the recommended operational configuration based, at least in part, on the user behavioral information.

10. A method of claim 1, wherein the estimated comfortable operation configuration, the maximum operational configuration, the recommended operational configuration, or a combination thereof includes, at least in part, a speed parameter, an acceleration rate parameter, a braking rate parameter, a following distance parameter, or a combination thereof.

11. An apparatus comprising:
    at least one processor; and
    at least one memory including computer program code for one or more programs, the at least one memory and the computer program code configured to, with the at least one processor, cause the apparatus to perform at least the following, determine user vision capability information for one or more occupants of at least one vehicle, wherein the user vision capability information is based on assessment of vision perception of the one or more occupants relative to contextual environment;

process and/or facilitate a processing of the user vision capability information to determine an estimated comfortable operational configuration for the at least one vehicle, determine a maximum operational configuration for the at least one vehicle; and determine a recommended operational configuration for the at least one vehicle based, at least in part, on the estimated comfortable operational configuration and the maximum operational configuration.

12. An apparatus of claim 11, wherein the apparatus is further caused to:

determine occupant line-of-sight information for the one or more occupants with respect to their position within the at least one vehicle, wherein the user vision capability information is based, at least in part, on the line-of-sight information.

13. An apparatus of claim 11, wherein the apparatus is further caused to:

process and/or facilitate a processing of imaging data captured from one or more camera sensors of the at least one vehicle, mapping data, environmental information, contextual information, or a combination thereof to determine the user vision capability information.

14. An apparatus of claim 11, wherein the apparatus is further caused to:

determine vehicle sensor-based line-of-sight information, vehicle capability information, posted maximum configuration information for a travel segment, or a combination thereof to determine the maximum operational configuration.

15. An apparatus of claim 11, wherein the apparatus is further caused to:

determine occupant response information to one or more objects visible from the at least one vehicle;

determine distance information to the one or more objects; and determine the user vision capability information based, at least in part, on the occupant response information, the distance information, or a combination thereof.

16. An apparatus of claim 11, wherein the apparatus is further caused to:

cause, at least in part, a presentation of at least one request to the one or more occupants to specify a comfort level associated with operating the at least one vehicle using the recommended operational configuration.

17. An apparatus of claim 11, wherein the apparatus is further caused to:

process and/or facilitate a processing of sensor data about the one or more occupants during an operation of the at least one vehicle using the recommended operational configuration to determine user behavioral information; and cause, at least in part, an updating of the recommended operational configuration based, at least in part, on the user behavioral information.

18. A non-transitory computer-readable storage medium carrying one or more sequences of one or more instructions which, when executed by one or more processors, cause an apparatus to perform:

determining user vision capability information for one or more occupants of at least one vehicle, wherein the user vision capability information is based on assessment of vision perception of the one or more occupants relative to contextual environment;

processing and/or facilitating a processing of the user vision capability information to determine an estimated comfortable operational configuration for the at least one vehicle;

determining a maximum operational configuration for the at least one vehicle; and determining a recommended operational configuration for the at least one vehicle based, at least in part, on the estimated comfortable operational configuration and the maximum operational configuration.

19. A non-transitory computer-readable storage medium of claim 18, wherein the apparatus is further caused to perform:

determining occupant line-of-sight information for the one or more occupants with respect to their position within the at least one vehicle, wherein the user vision capability information is based, at least in part, on the line-of-sight information.

20. A non-transitory computer-readable storage medium of claim 18, wherein the apparatus is further caused to perform:

processing and/or facilitating a processing of imaging data captured from one or more camera sensors of the at least one vehicle, mapping data, environmental information, contextual information, or a combination thereof to determine the user vision capability information.

* * * * *